US012628725B2

(12) United States Patent
Zhou et al.

(10) Patent No.: US 12,628,725 B2
(45) Date of Patent: May 19, 2026

(54) SEED GERMINATION ROTATING CYLINDER AND SEED GERMINATION MACHINE

(71) Applicant: T.F.ELECTRICAL TECHNOLOGY (SHENZHEN) CO., LTD., Shenzhen (CN)

(72) Inventors: Liwei Zhou, Shenzhen (CN); Zhengkuan Zhou, Shenzhen (CN); Wenhong Zhou, Shenzhen (CN)

(73) Assignee: T.F.ELECTRICAL TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/648,492

(22) Filed: Apr. 29, 2024

(65) Prior Publication Data

US 2025/0098564 A1 Mar. 27, 2025

(30) Foreign Application Priority Data

Sep. 25, 2023 (CN) .......................... 202311243718.9

(51) Int. Cl.
*A01C 1/02* (2006.01)
(52) U.S. Cl.
CPC ...................................... *A01C 1/02* (2013.01)
(58) Field of Classification Search
USPC .............. 47/61, 62 A, 58.1 SE, DIG. 9, 66.7
See application file for complete search history.

(56) References Cited

U.S. PATENT DOCUMENTS

| | | | | | |
|---|---|---|---|---|---|
| 3,909,978 | A | * | 10/1975 | Fleming | A01G 31/042 47/17 |
| 3,973,353 | A | * | 8/1976 | Dedolph | A01G 31/047 47/65 |
| 4,765,092 | A | * | 8/1988 | Cline | A01C 1/02 47/61 |
| 5,394,647 | A | * | 3/1995 | Blackford, Jr. | A01G 31/02 47/62 A |
| 5,515,648 | A | * | 5/1996 | Sparkes | A01G 7/045 47/DIG. 6 |
| 6,378,246 | B1 | * | 4/2002 | DeFoor | A01G 9/12 47/60 |

(Continued)

FOREIGN PATENT DOCUMENTS

| | | | | |
|---|---|---|---|---|
| CN | 202184024 | * | 4/2012 | A01G 31/02 |
| CN | 105613251 A | | 6/2016 | |

(Continued)

*Primary Examiner* — Andrea M Valenti

(57) ABSTRACT

A seed germination rotating cylinder and a seed germination machine are provided. The seed germination rotating cylinder includes a cylinder body, a seed germination chamber is defined in the cylinder body. At least one groove is defined on an outer side surface of the cylinder body, at least one protrusion corresponding to the at least one groove is disposed on an inner wall of the seed germination chamber. At least one opening is defined on a surface of the at least one protrusion, the at least one opening is communicated with the at least one groove, a height difference is formed between a connection of the at least one protrusion and the inner wall of the seed germination chamber and an opening beginning position of the at least one opening.

18 Claims, 4 Drawing Sheets

(56) References Cited

U.S. PATENT DOCUMENTS

| 7,171,782 | B2 * | 2/2007 | Felknor | A01G 9/024 |
| | | | | 47/65.5 |
| 7,818,917 | B2 * | 10/2010 | Brusatore | A01G 31/047 |
| | | | | 47/59 R |
| 9,374,952 | B1 * | 6/2016 | Cross | A01G 31/047 |
| 9,743,597 | B1 * | 8/2017 | Thomas | A01G 31/047 |
| 10,477,786 | B1 * | 11/2019 | Wilson | A01G 9/042 |
| 10,660,283 | B2 * | 5/2020 | Tidona | A01G 31/06 |
| 11,310,976 | B1 * | 4/2022 | Cross | A01G 27/003 |
| 2011/0016782 | A1 * | 1/2011 | Harder | A01G 9/02 |
| | | | | 47/87 |
| 2014/0059928 | A1 * | 3/2014 | McAleer | A01G 31/047 |
| | | | | 47/79 |
| 2015/0223418 | A1 * | 8/2015 | Collins | A01G 9/024 |
| | | | | 47/62 R |
| 2023/0088481 | A1 * | 3/2023 | Allgeier | A01G 31/047 |
| | | | | 47/62 R |
| 2023/0255147 | A1 * | 8/2023 | Cooley | A01G 9/028 |
| | | | | 47/66.5 |

FOREIGN PATENT DOCUMENTS

| CN | 208675712 | U | | 4/2019 | |
| CN | 110475470 | | * | 11/2019 | A01G 31/02 |
| CN | 111010924 | A | | 4/2020 | |
| CN | 211931255 | U | | 11/2020 | |
| CN | 115349442 | A | | 11/2022 | |
| KR | 20180005932 | | * | 1/2018 | A01G 31/047 |
| KR | 102227602 | | * | 3/2021 | A01G 9/246 |
| KR | 20230021477 | | * | 2/2023 | A01G 9/24 |
| KR | 20230021477 | A | | 2/2023 | |
| WO | WO 2016147195 | | * | 9/2016 | A01G 31/00 |
| WO | WO-2016147195 | A1 | * | 9/2016 | A01G 27/003 |

* cited by examiner

SEED GERMINATION ROTATING CYLINDER AND SEED GERMINATION MACHINE

TECHNICAL FIELD

The present disclosure relates to a technical field of seed germination devices, and in particular to a seed germination rotating cylinder and a seed germination machine.

BACKGROUND

Seed germination machines are configured to germinate seeds which are commonly used for eating or planting after germination, such as peas, soybeans, etc. Applicant provides a rotary germination machine in an earlier Chinese patent No. CN211931255U, in which a seed germination cylinder being rotatable and cylindrical is provided to germinate the seeds, compared with conventional immovable seed germination cavities, the seed germination cylinder ensures germination consistency of internal seeds. However, such structure still has defects as follows, first, gas outlets are only defined on an end portion of the seed germination cylinder, so that waste gas in the seed germination cylinder at a position distal from the end portion of the seed germination cylinder is difficult to effectively discharge, thereby causing a problem of poor discharging of gas; second, the gas outlets are defined on the end portion of the seed germination cylinder, and the gas outlets are only configured to discharge gas and cannot discharge water, if the gas outlets are used for discharging the water, water drops may be splashed out of the seed germination cylinder, such structure is limited to only supply the water for seed germination through a water atomizing manner, the seed germination cylinder cannot store the water, so that a relatively high atomization frequency is required and energy consumption is relatively large. In order to solve the defects, a seed germination rotating cylinder capable of storing the water and conveniently discharging the waste gas is required.

SUMMARY

Technical problems to be solved by the present disclosure is to provide a seed germination rotating cylinder and a seed germination machine aiming at defects in the prior art.

Technical solutions of the present disclosure for solving the technical problems are as follows.

The present disclosure provides the seed germination rotating cylinder, including a cylinder body, a seed germination chamber is defined in the cylinder body. At least one groove is defined on an outer side surface of the cylinder body, at least one protrusion corresponding to the at least one groove is disposed on an inner wall of the seed germination chamber. At least one opening is defined on a surface of the at least one protrusion, the at least one opening is communicated with the at least one groove, a height difference is formed between a connection of the at least one protrusion and the inner wall of the seed germination chamber and an opening beginning position of the at least one opening.

Furthermore, the at least one protrusion is hollow, and a hollow portion of the at least one protrusion is communicated with the at least one opening and the at least one groove.

Furthermore, at least one open slot is defined on an edge of an end portion of the at least one protrusion, the at least one open slot is communicated with the end portion of the at least one protrusion, a side surface of the at least one protrusion, and the hollow portion of the at least one protrusion.

Furthermore, at least one gas outlet is defined on an end portion of the cylinder body, a distance is formed between the at least one gas outlet and an edge of an end surface of the cylinder body.

Furthermore, a plurality of openings are provided, the plurality of the openings are defined on an end portion of the at least one protrusion and/or an outer side surface of the at least one protrusion.

Furthermore, a plurality of openings are provided, the plurality of the openings are annularly distributed on an end portion of the at least one protrusion.

Furthermore, a plurality of grooves and a plurality of protrusions are provided, each of the plurality of the grooves and each of the plurality of the protrusions constitute a unit, a plurality of units are distributed along a length direction of the cylinder body.

Furthermore, the at least one groove and the at least one protrusion are integrally formed and processed.

Furthermore, the at least one protrusion is cylindrical.

The present further provides the seed germination machine, including the seed germination rotating cylinder as foregoing.

Beneficial effects of the present disclosure are as follows.

According to the seed germination rotating cylinder of the present disclosure, the at least one groove and the at least one protrusion are cooperated with each other, the at least one opening defined on the at least one protrusion allows gas to discharge from a side of the cylinder body, and a height of the at least one protrusion allows the at least one opening to extend into germinating buds, so that discharging performance is ensured. Meanwhile, the height of the at least one protrusion allows a part of water to keep in the cylinder body, when the cylinder body rotates, the part of the water keeps supplying water in a germination process, so that continuous external water supply is not needed, and intermittent external water supply is sufficient, in this way, energy is saved, and uniformity of water supply is further ensured.

BRIEF DESCRIPTION OF DRAWINGS

In order to more clearly illustrate embodiments of the present disclosure or technical solutions in the prior art, the present disclosure is further described below with reference to the accompanying drawings and the embodiments, and the accompanying drawings in the following description are merely some embodiments of the present disclosure, and for those skill in the art, other accompanying drawings may be obtained according to the accompanying drawings without creative efforts.

DETAILED DESCRIPTION OF EMBODIMENTS

In order to make objectives, technical solutions, and advantages of the embodiments of the present disclosure clearer, following clearly and completely describes the technical solutions in the embodiments of the present disclosure. All other embodiments obtained by those who skilled in the art based on the embodiments of the present disclosure without creative efforts shall fall within a protection scope of the present disclosure.

Figure 1:
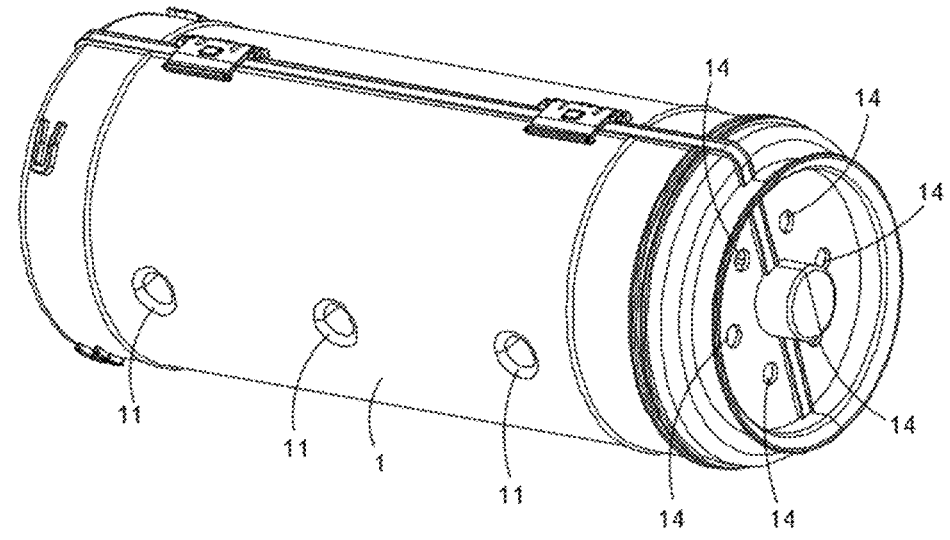
FIG. 1 is a structural schematic diagram of a seed germination rotating cylinder according to one embodiment of the present disclosure.
Figure 2:
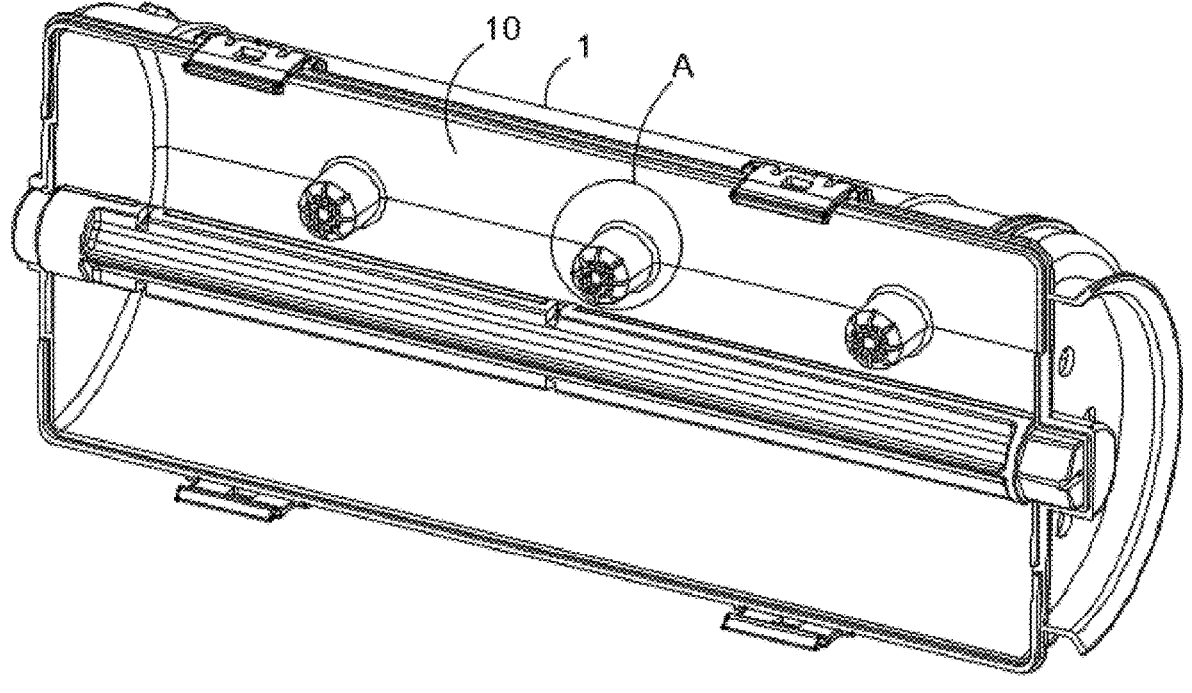
FIG. 2 is a structural schematic diagram of an inner structure of the seed germination rotating cylinder according to one embodiment of the present disclosure.
Figure 3:
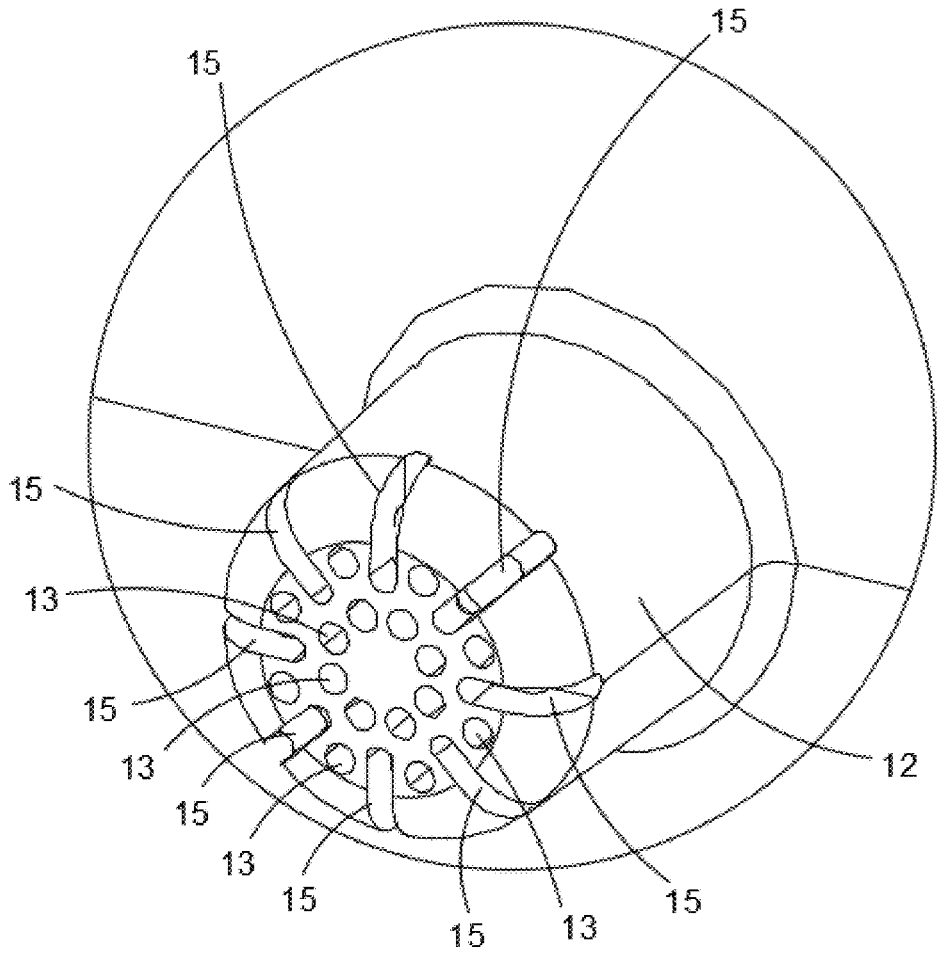
FIG. 3 is an enlarged schematic diagram of portion A shown in FIG. 2.
Figure 4:
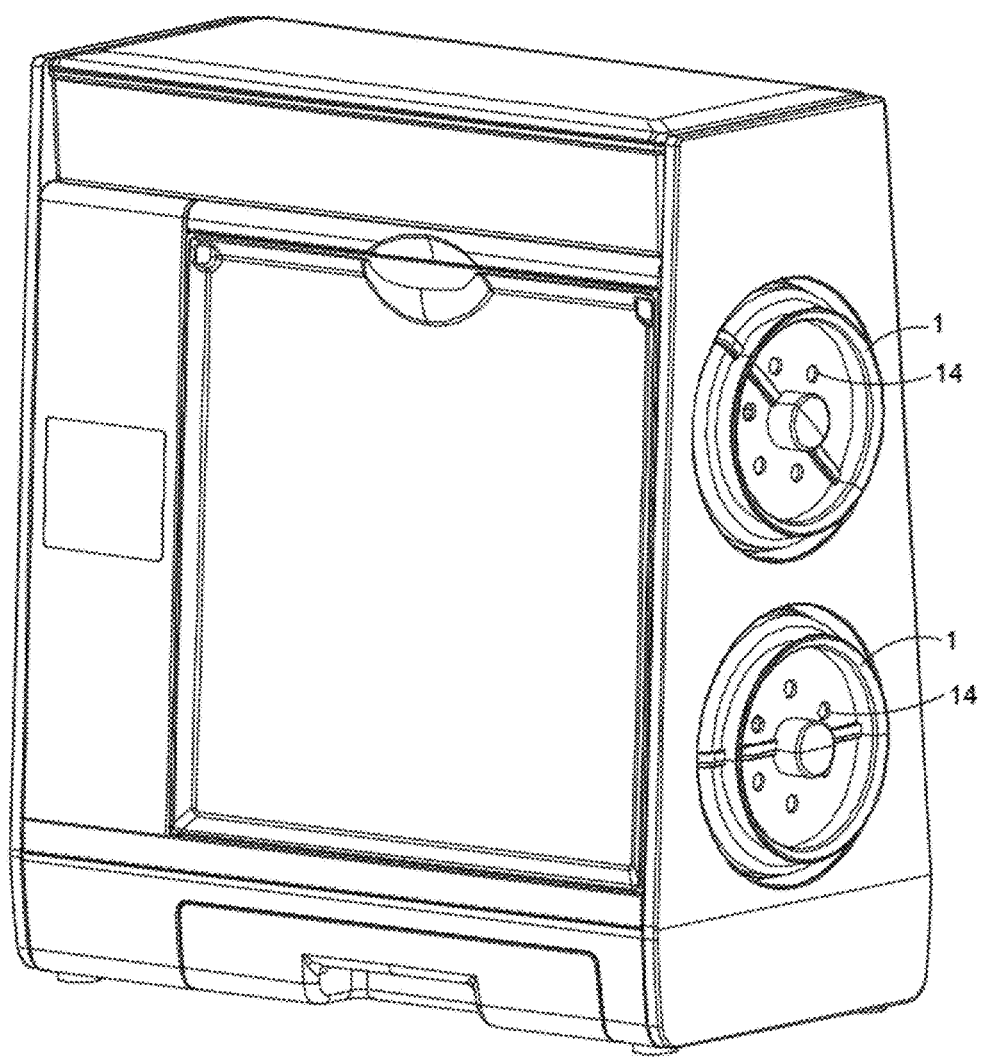
FIG. 4 is a structural schematic diagram of a seed germination machine according to one embodiment of the present disclosure.

The embodiments of the present disclosure provide a seed germination rotating cylinder, as shown in FIG. 1, and please further refer to FIGS. 2-3, the seed germination rotating cylinder includes a cylinder body 1, a seed germination chamber 10 is defined in the cylinder body 1. At least one groove 11 is defined on an outer side surface of the cylinder body 1, at least one protrusion 12 corresponding to the at least one groove 11 is disposed on an inner wall of the seed germination chamber 10. At least one opening 13 is defined on a surface of the at least one protrusion 12, the at least one opening 13 is communicated with the at least one groove 11, a height difference is formed between a connection of the at least one protrusion 12 and the inner wall of the seed germination chamber 1 and an opening beginning position of the at least one opening 13.

According to the seed germination rotating cylinder of the present disclosure, the at least one groove 11 and the at least one protrusion 12 are cooperated with each other, the at least one opening 13 defined on the at least one protrusion 12 allows gas to discharge from a side of the cylinder body 1, and a height of the at least one protrusion 12 allows the at least one opening 13 to extend into germinating buds, so that discharging performance is ensured. Meanwhile, the height of the at least one protrusion 12 allows a part of water to keep in the cylinder body 1, when the cylinder body 1 rotates, the part of the water keeps supplying water in a germination process, so that continuous external water supply is not needed, and intermittent external water supply is sufficient, in this way, energy is saved, and uniformity of water supply is further ensured.

It should be noted that a size of the at least one opening 13 needs to be small enough, so as to prevent buds from extending out of the at least one opening 13 or extending into the at least one opening 13 to cause blockage. In one embodiment, a plurality of openings 13 are provided, the plurality of the openings 13 are defined on an end portion of the at least one protrusion 12 and/or an outer side surface of the at least one protrusion 12.

In order to ensure the at least one opening 13 to smoothly discharge the gas, the at least one protrusion 12 is hollow, and a hollow portion of the at least one protrusion is communicated with the at least one opening 13 and the at least one groove 11. Such structural design ensures the gas in the at least one opening 13 to quickly pass through, especially when the plurality of the openings 13 are provided, the plurality of the openings are all communicated with the hollow portion, so that the gas is discharged much more smoothly.

In order to prevent the blockage, at least one open slot 15 is defined on an edge of an end portion of the at least one protrusion 12, the at least one open slot 15 is communicated with the end portion of the at least one protrusion 12, a side surface of the at least one protrusion 12, and the hollow portion of the at least one protrusion 12, and such design of open slot is not easily blocked by the buds, thereby ensuring gas discharging performance of the seed germination rotating cylinder.

For further ensuring the gas discharging performance of the seed germination rotating cylinder, at least one gas outlet 14 is defined on an end portion of the cylinder body 1, a distance is formed between the at least one gas outlet 14 and an edge of an end surface of the cylinder body 1. The distance is provided for storing water, so that the distance is preferably consistent with the height difference as foregoing or greater than the height difference as foregoing. Such design of gas outlet is mainly configured to assist the at least one opening 13 in discharging, which avoids the at least one opening 13 from not discharging in time and is further configured to discharge the gas at the end portion of the cylinder body 1. For further ensuring the gas discharging performance of the seed germination rotating cylinder, a diameter of the at least one gas outlet 14 may be appropriately large.

A plurality of openings 13 are provided, the plurality of the openings 46 are annularly distributed on an end portion of the at least one protrusion 12, an annular distribution manner of which is selected from a single-layer annular distribution manner and a multi-layer annular distribution manner. Such distribution is to arrange the plurality of the openings 46 as more as possible in a limited space; certainly, other distribution manners, such as a matrix, may also be used, and simple transformation based on the distribution manner also belongs to a protection scope of the present disclosure.

A plurality of grooves 11 and a plurality of protrusions 12 are provided, each of the plurality of the grooves 11 and each of the plurality of the protrusions 12 constitute a unit, a plurality of units are distributed along a length direction of the cylinder body 1. Such design is provided to solve discharging problems of each area of the cylinder body 1, and certainly, a specific arrangement of the plurality of the units is also selected according to actual situations or personal preferences, and simple transformation based on such arrangement also belongs to the protection scope of the present disclosure.

In addition, a length of at least one groove 11 and a length of at least one protrusion 12 are also selected to be larger to cover more areas of the cylinder body 1, so as to reduce the number of the units, and corresponding deformation solution thereof also falls within the scope of protection of the present disclosure.

The at least one groove 11 and the at least one protrusion 12 are integrally formed and processed. If the cylinder body 1 is made of metal, the at least one groove 11 and the at least one protrusion 12 being hollow is formed and processed on an outer surface of cylinder body 1; if the cylinder body 1 is made of plastic, the cylinder body 1, the at least one groove 11, and the at least one protrusion 12 are formed by one-step injection molding. The cylinder body 1 is very simple and convenient in forming and processing, and a finished product also has better mechanical strength.

The at least one protrusion 12 is cylindrical, and such shape is only a preferred embodiment, certainly, other shapes, such as a cuboid, a cone, a circular truncated cone, etc., may also be used, and a simple transformation based on such shape also belongs to the protection scope of the present disclosure.

The present disclosure further provides a seed germination machine, including the seed germination rotating cylinder as foregoing.

It should be understood that those who skilled in the art may improve or transform according to the foregoing description, and all these improvements and transformations shall fall within a protection scope of appended claims of the present disclosure.

What is claimed is:
1. A seed germination rotating cylinder, comprising:
   a cylinder body;

a seed germination chamber being defined in the cylinder body; wherein the seed germination chamber is configured to germinate seeds therein;

a plurality of grooves being defined in the cylinder body, wherein each of the grooves is recessed from an outer surface of the cylinder body toward the chamber such that a plurality of protrusions are formed in the chamber at an inner surface of the cylinder body; wherein a plurality of openings are annularly defined in each of the protrusions at a top surface of each of the protrusions and communicated with each of the grooves; wherein a height difference is formed between a connection of each of the protrusions and the inner surface and the top surface of each of the protrusions; each of the protrusions is hollow, and a hollow portion of each of the protrusions is communicated with the plurality of openings and each of the grooves;

wherein the plurality of openings are configured to discharge gas, which is generated in the seed germination chamber of the cylinder body during seed germination, out of the cylinder body through the plurality of openings, the hollow portion, and each of the grooves sequentially and prevent plants in the chamber from entering the hollow portion through the plurality of openings, and the protrusions are configured not to receive plants;

at least one open slot is defined in an edge of an end portion of each of the protrusions, the at least one open slot penetrates a top wall of each of the protrusions and a side wall of each of the protrusions, and the at least one open slot is communicated with the hollow portion.

2. The seed germination rotating cylinder according to claim 1, wherein the plurality of openings comprises a plurality of first openings and a plurality of second openings, the first openings are distributed in a first ring, and the second openings are distributed in a second ring surrounding the first ring.

3. The seed germination rotating cylinder according to claim 2, wherein the number of the at least one open slot is more than one, each of the more than one open slot comprises a first end part and a second end part, the first end part penetrates the top wall, the second end part penetrates the side wall, and each of the more than one open slot is communicated with the hollow portion.

4. The seed germination rotating cylinder according to claim 3, wherein the first end part is defined between two adjacent second openings of the plurality of second openings, and is defined at a side of the first ring toward the second ring.

5. The seed germination rotating cylinder according to claim 1, wherein at least one gas outlet is defined in an end portion of the cylinder body, and a distance is formed between the at least one gas outlet and an edge of an end surface of the cylinder body; the distance is provided for storing water, and the distance is consistent with the height difference or greater than the height difference.

6. The seed germination rotating cylinder according to claim 5, wherein the number of the at least one gas outlet is more than one, and the more than one gas outlet is distributed in a ring.

7. The seed germination rotating cylinder according to claim 1, wherein the grooves correspond to the protrusions one-to-one to form a plurality of units, and the units are distributed along a length direction of the cylinder body.

8. The seed germination rotating cylinder according to claim 1, wherein each of the grooves and a respective one of the protrusions are integrally formed and processed.

9. The seed germination rotating cylinder according to claim 1, wherein each of the protrusions is cylindrical.

10. A seed germination machine, comprising a seed germination rotating cylinder, wherein the seed germination rotating cylinder comprises:

a cylinder body;

a seed germination chamber being defined in the cylinder body, wherein the seed germination chamber is configured to germinate seeds therein;

a plurality of grooves being defined in the cylinder body, wherein each of the grooves is recessed from an outer surface of the cylinder body toward the chamber such that a plurality of protrusions are formed in the chamber at an inner surface of the cylinder body; wherein a plurality of openings are annularly defined in each of the protrusions at a top surface of each of the protrusions and communicated with each of the grooves; wherein a height difference is formed between a connection of each of the protrusions and the inner surface and the top surface of each of the protrusions; each of the protrusions is hollow, and a hollow portion of each of the protrusions is communicated with the plurality of openings and each of the grooves;

wherein the plurality of openings are configured to discharge gas, which is generated in the seed germination chamber of the cylinder body during seed germination, out of the cylinder body through the plurality of openings, the hollow portion, and each of the grooves sequentially and prevent plants in the chamber from entering the hollow portion through the plurality of openings, and the protrusions are configured not to receive plants;

at least one open slot is defined in an edge of an end portion of each of the protrusions, the at least one open slot penetrates a top wall of each of the protrusions and a side wall of each of the protrusions, and the at least one open slot is communicated with the hollow portion.

11. The seed germination rotating cylinder according to claim 10, wherein the plurality of openings comprises a plurality of first openings and a plurality of second openings, the first openings are distributed in a first ring, and the second openings are distributed in a second ring surrounding the first ring.

12. The seed germination rotating cylinder according to claim 11, wherein the number of the at least one open slot is more than one, each of the more than one open slot comprises a first end part and a second end part, the first end part penetrates the top wall, the second end part penetrates the side wall, and each of the more than one open slot is communicated with the hollow portion.

13. The seed germination rotating cylinder according to claim 12, wherein the first end part is defined between two adjacent second openings of the plurality of second openings, and is defined at a side of the first ring toward the second ring.

14. The seed germination rotating cylinder according to claim 10, wherein at least one gas outlet is defined in an end portion of the cylinder body, and a distance is formed between the at least one gas outlet and an edge of an end surface of the cylinder body; the distance is provided for storing water, and the distance is consistent with the height difference or greater than the height difference.

15. The seed germination rotating cylinder according to claim 14, wherein the number of the at least one gas outlet is more than one, the more than one gas outlet is distributed in a ring.

16. The seed germination rotating cylinder according to claim 10, wherein the grooves correspond to the protrusions one-to-one to form a plurality of units, and the units are distributed along a length direction of the cylinder body.

17. The seed germination rotating cylinder according to claim 10, wherein each of the grooves and a respective one of the protrusions are integrally formed and processed.

18. The seed germination rotating cylinder according to claim 10, wherein each of the protrusions is cylindrical.

* * * * *